(12) United States Patent
Reid et al.

(10) Patent No.: US 9,037,282 B2
(45) Date of Patent: May 19, 2015

(54) MANUFACTURING CONTROL SYSTEM

(75) Inventors: Eric M. Reid, Bothell, WA (US); Alan Ray Merkley, Greenbank, WA (US)

(73) Assignee: THE BOEING COMPANY, Chicago, IL (US)

( * ) Notice: Subject to any disclaimer, the term of this patent is extended or adjusted under 35 U.S.C. 154(b) by 662 days.

(21) Appl. No.: 13/167,879

(22) Filed: Jun. 24, 2011

(65) Prior Publication Data

US 2012/0330448 A1    Dec. 27, 2012

(51) Int. Cl.
*G06F 19/00* (2011.01)
*G05B 19/418* (2006.01)

(52) U.S. Cl.
CPC *G05B 19/41805* (2013.01); *G05B 2219/31034* (2013.01); *G05B 2219/31286* (2013.01); *G05B 2219/31308* (2013.01)

(58) Field of Classification Search
USPC .......................................... 700/286, 287, 291
See application file for complete search history.

(56) References Cited

U.S. PATENT DOCUMENTS

| | | | |
|---|---|---|---|
| 4,661,912 A | 4/1987 | Imanishi | |
| 4,935,863 A | 6/1990 | Calvas et al. | |
| 5,388,051 A | 2/1995 | Seki et al. | |
| 5,469,361 A | 11/1995 | Moyne | |
| 6,843,328 B2 | 1/2005 | Boyl-Davis et al. | |
| 6,845,279 B1 * | 1/2005 | Gilmore et al. | 700/115 |
| 6,898,484 B2 | 5/2005 | Lemelson et al. | |
| 7,031,798 B2 | 4/2006 | Brown et al. | |
| 7,055,233 B1 * | 6/2006 | Hofer et al. | 29/430 |
| 7,137,107 B1 | 11/2006 | Brown | |
| 7,139,843 B1 | 11/2006 | Brown et al. | |
| 7,305,277 B2 | 12/2007 | Freeman et al. | |
| 7,643,893 B2 | 1/2010 | Troy et al. | |
| 7,774,083 B2 | 8/2010 | Freeman et al. | |
| 7,904,194 B2 | 3/2011 | Brown et al. | |
| 8,316,742 B2 * | 11/2012 | Craig et al. | 82/1.11 |
| 2007/0136218 A1 * | 6/2007 | Bauer et al. | 706/12 |
| 2007/0162157 A1 | 7/2007 | Chandhoke | |
| 2008/0009969 A1 | 1/2008 | Bruemmer et al. | |
| 2008/0033684 A1 | 2/2008 | Vian et al. | |
| 2009/0306823 A1 | 12/2009 | Baltes et al. | |
| 2011/0071652 A1 | 3/2011 | Brown et al. | |

OTHER PUBLICATIONS

Mondada et al., "The Cooperation of Swarm-Bots", IEEE 2005.*

* cited by examiner

*Primary Examiner* — Carlos Ortiz Rodriguez
(74) *Attorney, Agent, or Firm* — Yee & Associates, P.C.

(57) ABSTRACT

A method and apparatus comprising a tracking system and a controller in communication with the tracking system. The tracking system is configured to identify characteristics about a group of portable machines configured to perform a number of manufacturing operations on a workpiece. The controller is configured to control performance of the number of manufacturing operations on the workpiece using the characteristics about the group of portable machines identified using the tracking system.

19 Claims, 11 Drawing Sheets

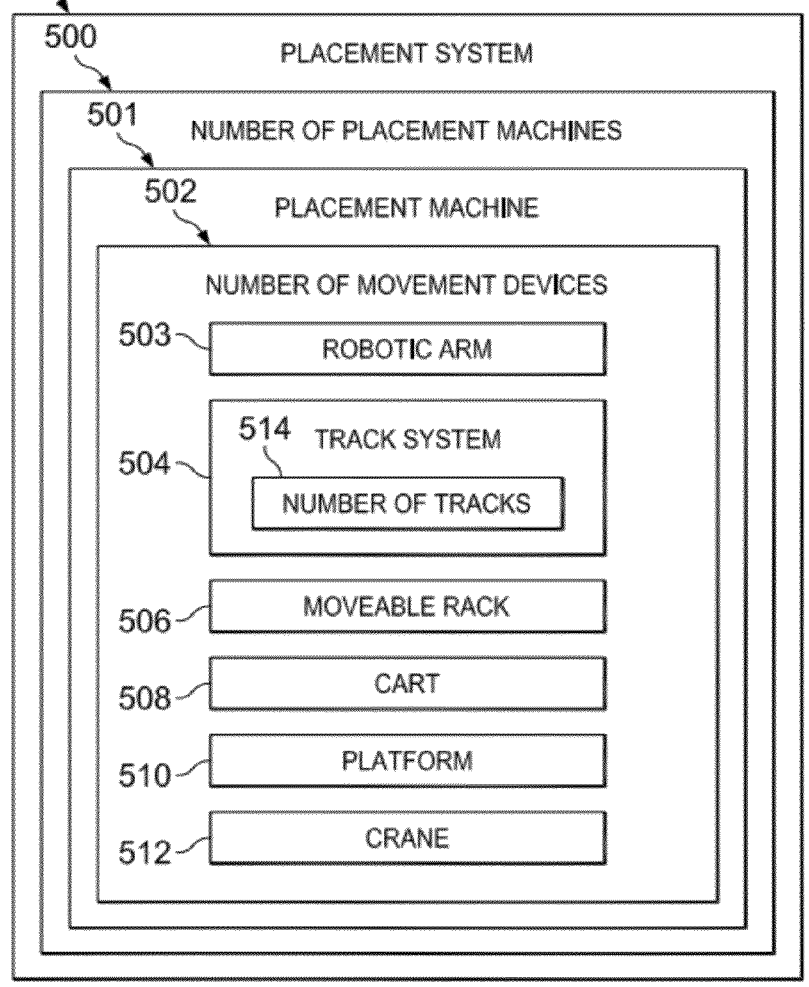
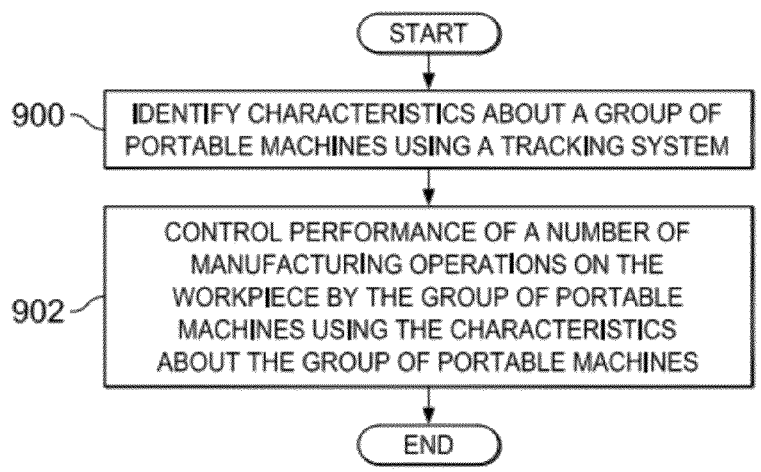

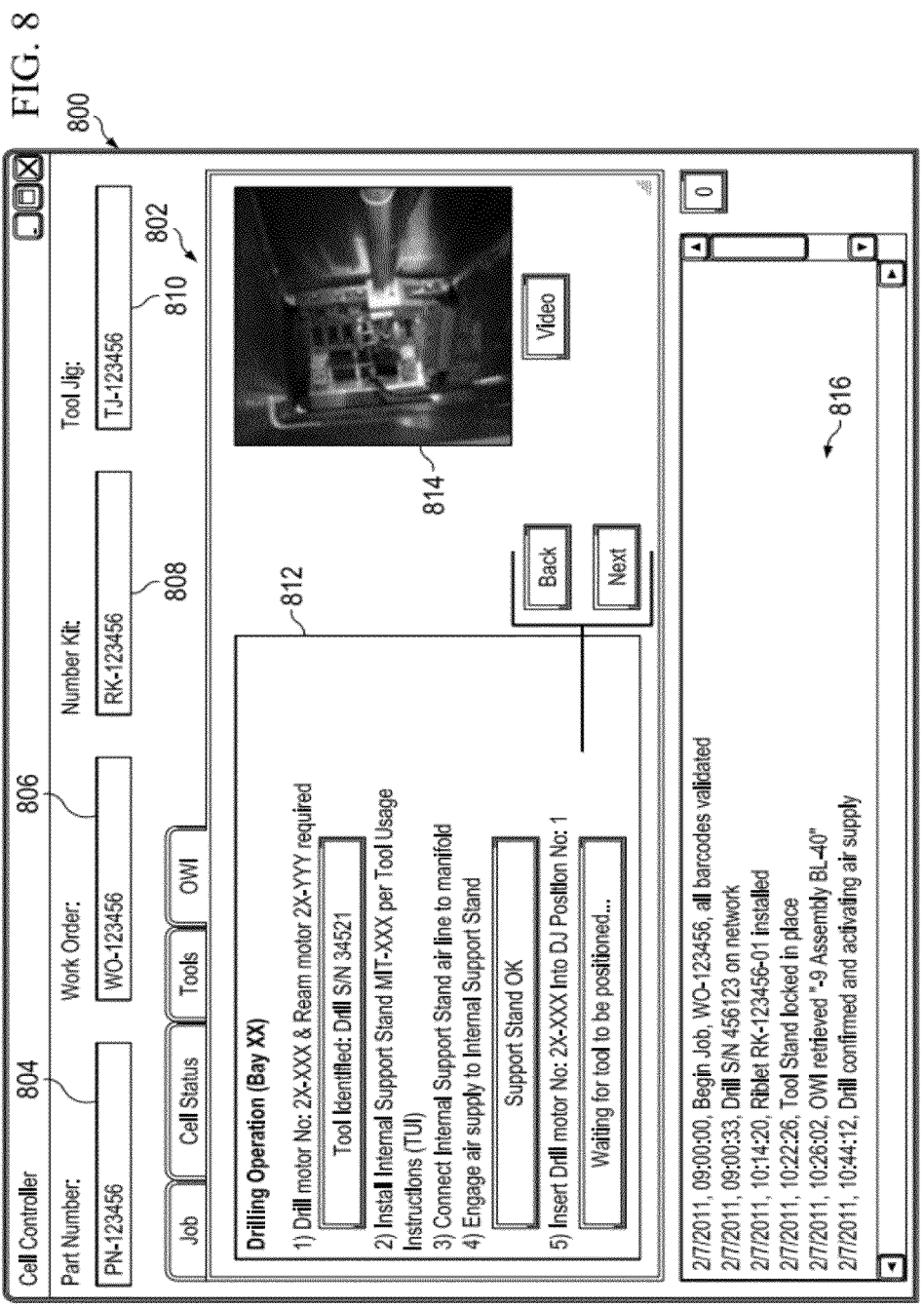

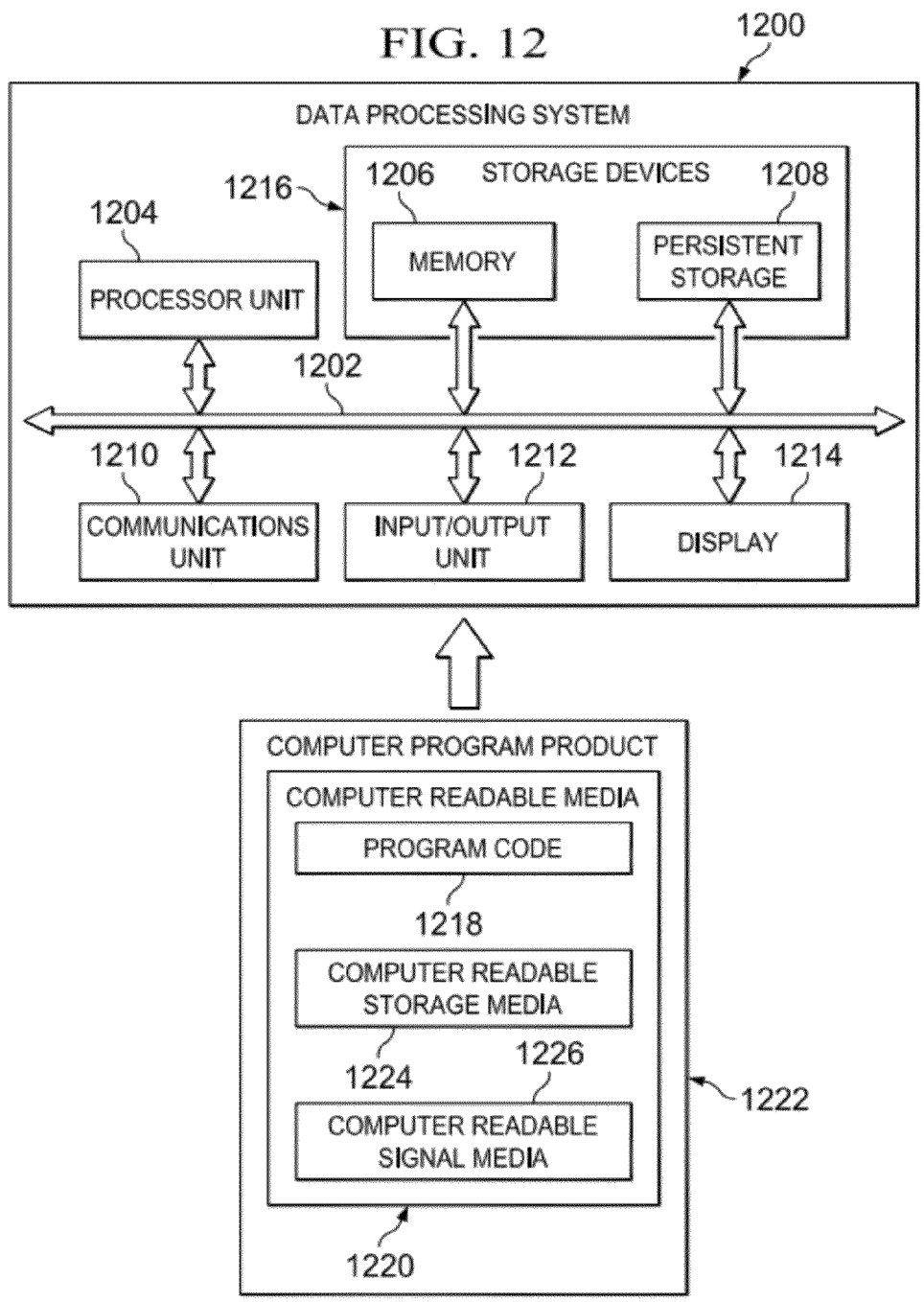

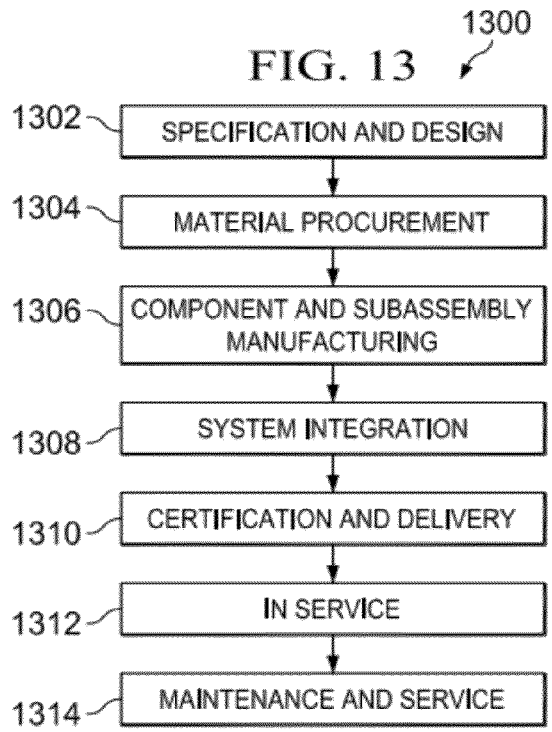
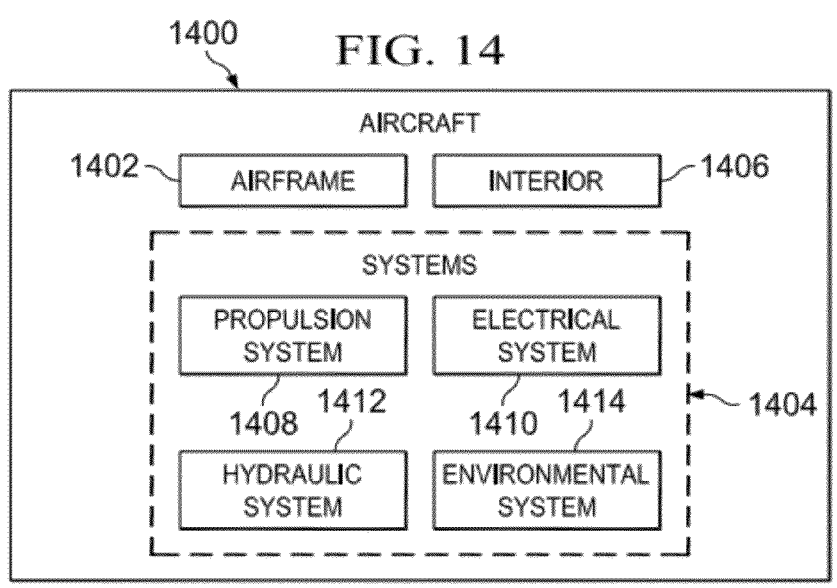

MANUFACTURING CONTROL SYSTEM

BACKGROUND INFORMATION

1. Field

The present disclosure relates generally to manufacturing and, in particular, to manufacturing structures using machines. Still more particularly, the present disclosure relates to a method and apparatus for manufacturing structures using computer controlled machines.

2. Background

When manufacturing structures, such as those for aircraft, many different operations are performed to form the structures. For example, two components may be assembled to form a structure. These components may be fastened and/or attached to each other during the manufacturing process.

Machines may be used to position the components relative to each other. Further, these and/or other machines also may be used to form holes, install fasteners, and seal the holes. Operations also may be performed to inspect these manufacturing operations as well as the finished structure.

In manufacturing structures, different types of machines are used. Typically, these machines are often large and not easily moveable. For example, large machines may be in fixed locations. As a result, the different components are moved to the location of the machines to perform different manufacturing operations.

These large machines are in fixed locations and may be computer controlled machines that provide desired accuracy as well as repeatability. With these types of computer controlled machines, a high level of timing may be present. As a result, less human intervention or operation is needed. These types of machines also are easily manageable.

However, the cost and/or amount of space in a manufacturing facility needed for these types of machines is often greater than desired. Further, performing maintenance for these machines may be difficult. When using a machine in a fixed location to perform manufacturing operations on one or more components, performing concurrent work on other portions of these components may be restricted. This restriction may be caused by, for example, zones in which the operators are not allowed to enter during the performance of the manufacturing operations by the machine.

When assembling components, portable machines may also be used. These machines are moveable from one location to another location. Portable machines typically cost less and have less complexity as compared to the larger machines that require movement of parts to those machines. These types of portable machines may allow for many machines to be used at substantially the same time. As a result, the time needed to process components may be reduced.

Portable machines, however, may require frequent movement to different locations to perform manufacturing operations. The time needed to setup these types of machines to perform machining operations may be greater than desired.

Further, portable machines typically only provide one type of functionality as compared to larger machines which may be configured to perform multiple functions. For example, a portable machine may only be configured to drill holes and may not be configured to seal and/or install fasteners into the holes. A different machine may need to be moved to the location to perform other functions.

Although portable machines provide greater flexibility than machines that are in fixed locations, more coordination of these machines is needed to provide efficient performance in manufacturing operations. Further, more experienced operators may be required to operate portable machines as compared to machines that are in fixed locations. For example, operators may need to be experienced in placing the portable machines in the appropriate locations, selecting the correct programs for operating the portable machines, and taking into account locations that may not be reachable by the portable machines.

Therefore, it would be advantageous to have a method and apparatus that takes in account at least some of the issues discussed above as well as possibly other issues.

SUMMARY

In one advantageous embodiment, an apparatus comprises a tracking system and a controller in communication with the tracking system. The tracking system is configured to identify characteristics about a group of portable machines configured to perform a number of manufacturing operations on a workpiece. The controller is configured to control performance of the number of manufacturing operations on the workpiece using characteristics about the group of portable machines identified by the tracking system.

In another advantageous embodiment, an aircraft manufacturing system comprises a group of portable machines, a tracking system, and a controller. The group of portable machines is configured to perform a number of manufacturing operations on a workpiece for an aircraft. The tracking system is configured to identify characteristics about the group of portable machines. The controller is in communication with the tracking system. The controller is configured to control performance of the number of manufacturing operations on the workpiece using at least one of the characteristics about the group of portable machines identified using the tracking system, information about the workpiece, and information about the group of portable machines.

In yet another advantageous embodiment, a method for managing manufacturing operations is provided. Characteristics about a group of portable machines are identified using a tracking system and a controller. Performance of a number of manufacturing operations on a workpiece is controlled by the group of portable machines using the characteristics about the group of portable machines identified using the tracking system.

The features, functions, and advantages can be achieved independently in various embodiments of the present disclosure or may be combined in yet other embodiments in which further details can be seen with reference to the following description and drawings.

BRIEF DESCRIPTION OF THE DRAWINGS

The novel features believed characteristic of the disclosure are set forth in the appended claims. The disclosure itself, however, as well as a preferred mode of use, further objectives, and advantages thereof, will best be understood by reference to the following detailed description of an advantageous embodiment of the present disclosure when read in conjunction with the accompanying drawings, wherein:

FIG. 5 is an illustration of a placement system in the form of a block diagram in accordance with an advantageous embodiment;

FIG. 8 is an illustration of a display on a graphical user interface in accordance with an advantageous embodiment;

FIG. 9 is an illustration of a flowchart of a process for managing manufacturing operations in accordance with an advantageous embodiment;

FIG. 12 is an illustration of a data processing system in accordance with an advantageous embodiment;

FIG. 13 is an illustration of an aircraft manufacturing and service method in accordance with an advantageous embodiment; and FIG. 14 is an illustration of an aircraft in which an advantageous embodiment may be implemented.

DETAILED DESCRIPTION

The different advantageous embodiments recognize and take into account a number of different considerations. A number, as used herein with reference to items, means one or more items. For example, a number of considerations is one or more considerations. For example, the different advantageous embodiments recognize and take into account that using portable machines is more desirable than using machines that are in fixed locations if the portable machines can be more accurately controlled.

The different advantageous embodiments also recognize and take into account that using a computer system to manage the placement and programming of portable machines may reduce the time needed for operating these machines. Further, using this type of computer system may reduce the number of errors that may occur when operating these portable machines.

Thus, the different advantageous embodiments provide a method and apparatus for managing manufacturing operations. In one advantageous embodiment, an apparatus comprises a tracking system and a controller in communication with the tracking system. The tracking system is configured to identify characteristics about a group of portable machines configured to perform a number of manufacturing operations on a workpiece. The controller is configured to control performance of the number of manufacturing operations on the workpiece using the characteristics about the group of portable machines identified using the tracking system.

Figure 1:
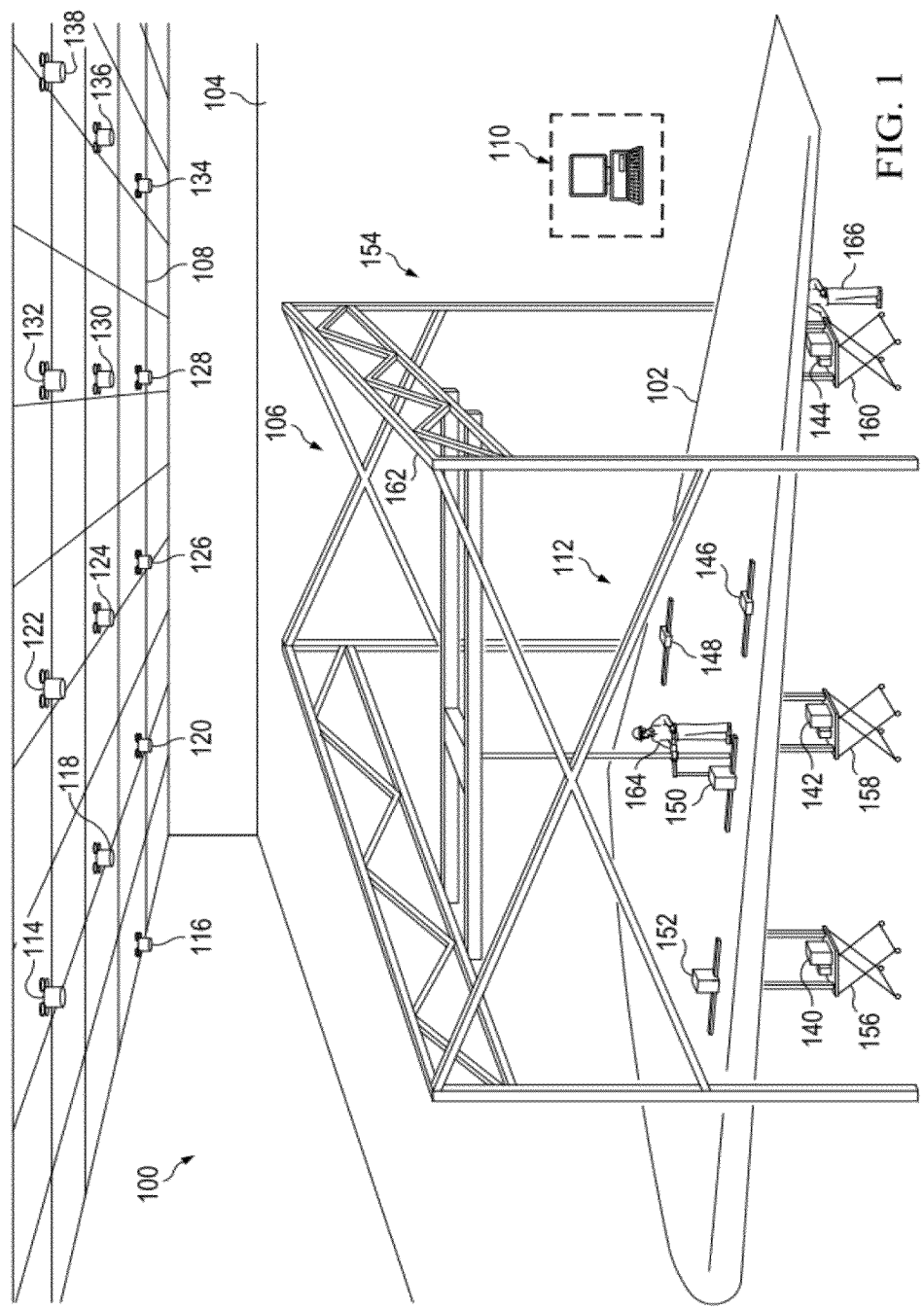
FIG. 1 is an illustration of a manufacturing environment in accordance with an advantageous embodiment.

With reference now to the figures and, in particular, with reference to FIG. 1, an illustration of a manufacturing environment is depicted in accordance with an advantageous embodiment. In this depicted example, a pictorial illustration of manufacturing environment 100 is shown.

In this illustrative example, manufacturing operations are performed on wing 102 in manufacturing environment 100. Wing 102 is located inside of cell 104 within manufacturing environment 100. Cell 104 is a location in which manufacturing operations are performed on a structure, such as wing 102. In these illustrative examples, manufacturing system 106 comprises tracking system 108, controller 110, and group of portable machines 112.

In this illustrative example, tracking system 108 comprises cameras 114, 116, 118, 120, 122, 124, 126, 128, 130, 132, 134, 136, and 138. Group of portable machines 112 comprises portable machines 140, 142, 144, 146, 148, 150, and 152. As used herein, "a group", when used with reference to items means one or more items. For example, "group of portable machines 112" is one or more portable machines.

Tracking system 108 is configured to identify characteristics of group of portable machines 112 in these illustrative examples. A portable machine in group of portable machines 112 is any machine or piece of equipment that may be used to perform a manufacturing operation on a workpiece.

In this illustrative example, manufacturing system 106 also includes placement system 154. Placement system 154 includes placement machines 156, 158, 160, and 162. Placement machines 156, 158, and 160 are used to place portable machines 140, 142, and 144 on the underside of wing 102, while placement machine 162 is used to place portable machines 146, 148, 150, and 152 on the topside of wing 102 in these illustrative examples.

Placement system 154 is controlled by controller 110 in these illustrative examples. Controller 110 takes the form of a computer and identifies locations at which group of portable machines 112 should be placed.

Placement of group of portable machines 112 is directed by controller 110 to place group of portable machines 112. The placement is based on information about group of portable machines 112 identified by tracking system 108 in these illustrative examples. This information includes characteristics about group of portable machines 112. In addition to using placement system 154 to place group of portable machines 112, human operators such as human operator 164 and human operator 166 also may assist in positioning group of portable machines 112 relative to wing 102.

With the use of controller 110 and the information identified by tracking system 108, group of portable machines 112 may be more precisely placed onto locations on wing 102 to perform manufacturing operations as compared to human operators placing group of portable machines 112 onto wing 102 without assistance from controller 110.

Further, in these illustrative examples, controller 110 is configured to control the performance of manufacturing operations by group of portable machines 112 using the characteristics about group of portable machines 112 identified by tracking system 108.

Figure 2:
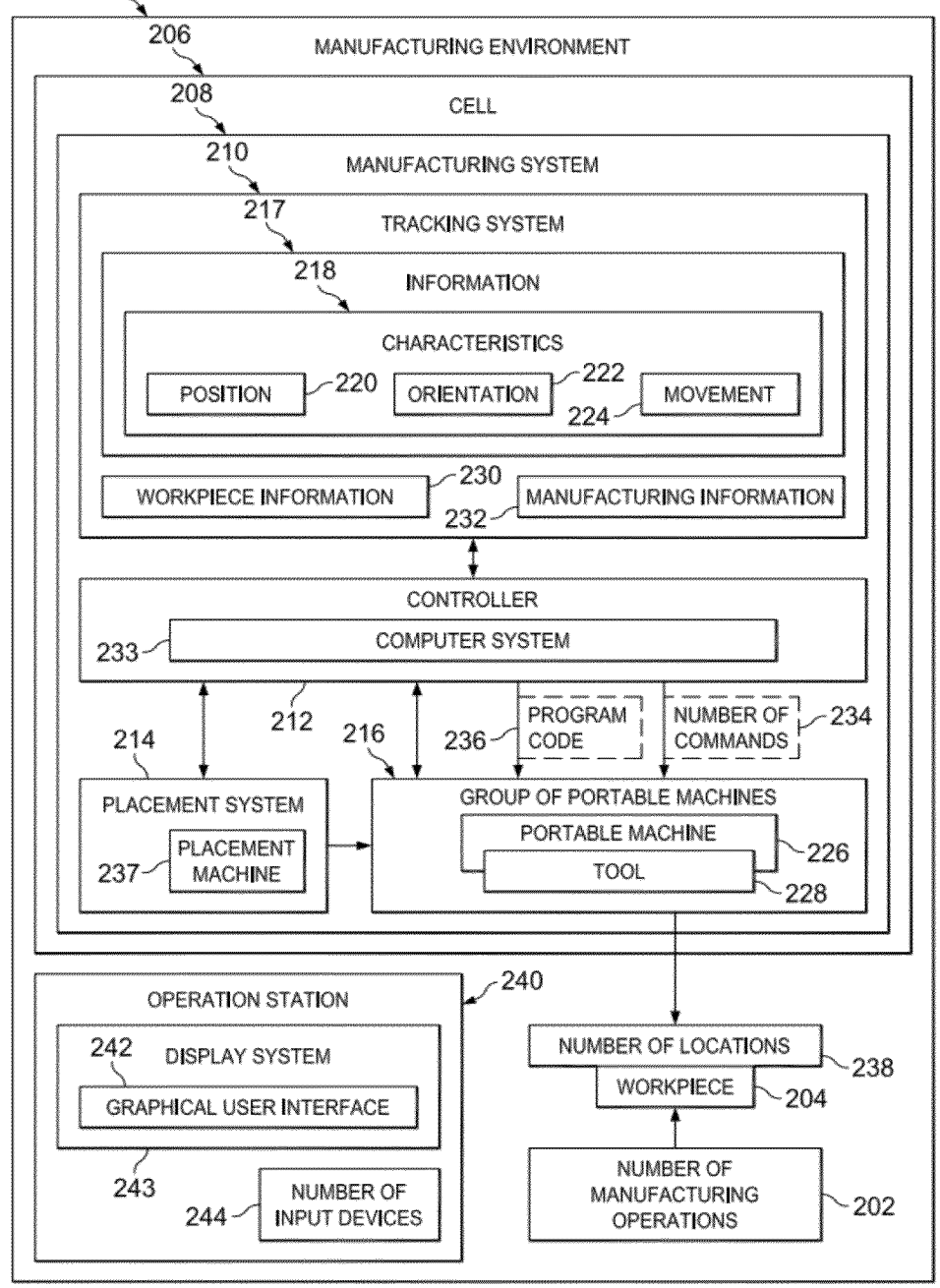
FIG. 2 is an illustration of a manufacturing environment in the form of a block diagram in accordance with an advantageous embodiment.

With reference now to FIG. 2, an illustration of a manufacturing environment in the form of a block diagram is depicted in accordance with an advantageous embodiment. Manufacturing environment 100 in FIG. 1 is an example of one implementation for manufacturing environment 200 shown in block form in FIG. 2.

Manufacturing environment 200 is used to perform number of manufacturing operations 202 on workpiece 204. Workpiece 204 may be any object on which number of manufacturing operations 202 are performed by a machine. A manufacturing operation in the number of manufacturing operations is selected from one of a drilling operation, a sealing operation, a fastener installation operation, an inspection operation, and a painting operation. Workpiece 204 may be a single part or multiple parts.

Wing 102 in FIG. 1 is an example of workpiece 204. Other illustrative examples of workpiece 204 may include, for example, without limitation, an aircraft, an aircraft part, a wing, a stabilizer, a portion of a fuselage, an engine, an engine housing, a landing gear assembly, and other suitable types of workpieces.

In these illustrative examples, number of manufacturing operations 202 are performed on workpiece 204 inside cell 206. Cell 206 is a location in which number of manufacturing operations 202 may be performed. In these illustrative examples, cell 206 may be an enclosed space, such as a building, a hanger, or some other suitable structure. In other illustrative examples, cell 206 may be an area in a manufacturing facility, a factory, a production plant, or some other location.

Manufacturing system 208 is configured to perform number of manufacturing operations 202 on workpiece 204 within cell 206. As depicted, manufacturing system 208 comprises tracking system 210, controller 212, placement system 214, and group of portable machines 216.

A portable machine in group of portable machines 216 is a machine that can be moved to a number of different locations on workpiece 204 to perform one or more of number of manufacturing operations 202. Portable machines in group of portable machines 216 may be of different types and/or the same type. Portable machine 226 is an example of one of group of portable machines 216. Further, tool 228 may be connected to portable machine 226 in these illustrative examples.

As used herein, a first component "connected to" a second component means that the first component can be connected directly or indirectly to the second component. In other words, additional components may be present between the first component and the second component. The first component is considered to be indirectly connected to the second component when one or more additional components are present between the two components. When the first component is directly connected to the second component, no additional components are present between the two components. Tool 228 is the first component, and portable machine 226 is the second component in this illustrative example.

Tool 228 may be configured to perform one or more of number of manufacturing operations 202 on workpiece 204. In these illustrative examples, tool 228 may be moved independently of portable machine 226. In other words, tool 228 may be moved relative to workpiece 204 without moving portable machine 226.

In these illustrative examples, portable machine 226 may take the form of a hand tool, a flex track machine, a robotic machine, or some other suitable type of machine that can move relative to workpiece 204. A flex track machine is a modular multi-axis numerically-controlled positioning system that performs number of manufacturing operations 202.

In this illustrative example, tracking system 210 is configured to identify information 217 about group of portable machines 216. In particular, information 217 about group of portable machines 216 is information about one, some, or all of group of portable machines 216. Further, this information may be about the tools connected to these portable machines. For example, information 217 may include information about portable machine 226 and/or tool 228 connected to portable machine 226.

Additionally, information 217 may include characteristics 218 about one, some, or all of group of portable machines 216 and/or any of the tools connected to group of portable machines 216. Characteristics 218 may include, for example, at least one of position 220, orientation 222, movement 224, and other suitable characteristics about group of portable machines 216. Characteristics 218 may also include an identifier for a portable machine in group of portable machines 216.

As used herein, the phrase "at least one of", when used with a list of items, means different combinations of one or more of the listed items may be used and only one of each item in the list is needed. For example, "at least one of item A, item B, and item C" may include, for example, without limitation, item A, or item A and item B. This example also may include item A, item B, and item C, or item B and item C. In other examples, "at least one of" may be, for example, without limitation, two of item A, one of item B, and ten of item C; four of item B and seven of item C; and other suitable combinations.

In these illustrative examples, position 220, orientation 222, and movement 224 may be identified for portable machine 226. Position 220, orientation 222, and movement 224 for portable machine 226 may be identified relative to workpiece 204 and/or cell 206. Additionally, position 220, orientation 222, and movement 224 may be identified for tool 228. Position 220, orientation 222, and movement 224 for tool 228 may be relative to workpiece 204, portable machine 226, and/or cell 206.

In these illustrative examples, tracking system 210 is configured to identify characteristics 218 about group of portable machines 216 in a number of different ways. As one illustrative example, tracking system 210 may use a motion capture system to identify characteristics 218.

Further, tracking system 210 may also be used to identify workpiece information 230 about workpiece 204 and/or manufacturing information 232. Workpiece information 230 about workpiece 204 may include a type of material for workpiece 204, dimensions of workpiece 204, a position of workpiece 204 in cell 206, an orientation of workpiece 204 in cell 206, information about features on workpiece 204 and/or other suitable types of information.

The features on workpiece 204 may include features already present on workpiece 204 prior to the performance of number of manufacturing operations 202, features formed by the performance of number of manufacturing operations 202, and/or other suitable types of features on workpiece 204. Features may include, for example, without limitation, holes in workpiece 204, fasteners installed in workpiece 204, sealant applied to workpiece 204, a flange on workpiece 204, and/or other suitable types of features.

In these depicted examples, manufacturing information 232 may include information about the performance of number of manufacturing operations 202 on workpiece 204 by group of portable machines 216. Manufacturing information 232 may include any information that may be used for performing number of manufacturing operations 202.

For example, manufacturing information 232 may include information about the features formed on workpiece 204 by group of portable machines 216, a total number of group of portable machines 216 to be used to perform number of manufacturing operations 202 on workpiece 204 at a point in time, a rate at which holes are formed on workpiece 204, a rate at which fasteners are installed in workpiece 204, and/or other suitable types of information.

In these illustrative examples, controller 212 may be implemented using computer system 233. Computer system 233 comprises a number of computers. When more than one computer is present in computer system 233, the computers may be in communication with each other.

As depicted, computer system 233 is present in cell 206 in these examples. However, in other illustrative examples, one or more of the computers in computer system 233 may be located in a location remote to cell 206. Further, in some illustrative examples, one or more of the computers in computer system 233 may be portable. For example, computer system 233 may be a laptop computer, tablet computer, a personal digital assistance computer, or some other suitable type of portable computer system. In this manner, computer system 233 may be moved to different locations other than cell 206.

Controller 212 may be implemented using hardware, software, or a combination of the two in computer system 233. When in the form of software, controller 212 may take the form of program code run by a computer within computer system 233.

In these illustrative examples, controller 212 is in communication with tracking system 210. For example, controller 212 may be configured to communicate with tracking system 210 using a number of wired communications links, a number of wireless communications links, a number of optical communications links, and/or other suitable types of communications links.

Controller 212 is configured to receive at least one of information 217 about group of portable machines 216, workpiece information 230, and manufacturing information 232 from tracking system 210. These different types of information may be received before, during, and/or after the performance of number of manufacturing operations 202.

Controller 212 is configured to control the performance of number of manufacturing operations 202 using at least one of information 217, workpiece information 230, and manufacturing information 232. In particular, in these illustrative examples, controller 212 may control the performance of number of manufacturing operations 202 by group of portable machines 216 on workpiece 204 using characteristics 218 about group of portable machines 216 identified using tracking system 210.

In these depicted examples, controller 212 may control the performance of number of manufacturing operations 202 using group of portable machines 216 in a number of different ways. For example, controller 212 may send number of commands 234 to group of portable machines 216 to perform a particular manufacturing operation in number of manufacturing operations 202. Number of commands 234 may be sent to one, some, or all of group of portable machines 216 to control the performance of the particular manufacturing operations by one, some, or all of group of portable machines 216.

Number of commands 234 may include, for example, without limitation, a command to move a tool a particular distance, a command to begin drilling, a command to apply sealant at a location on workpiece 204, a command to move a portable machine, and/or other suitable commands. These types of commands may be used when a portable machine has intelligence or a capability to perform different operations with less direction from controller 212.

In some illustrative examples, controller 212 may control the performance of number of manufacturing operations 202 by group of portable machines 216 by downloading program code 236 to group of portable machines 216. Program code 236 may be run by group of portable machines 216 to cause group of portable machines 216 to perform one or more of number of manufacturing operations 202.

Additionally, placement system 214 is configured to move group of portable machines 216 to number of locations 238 on workpiece 204. For example, placement machine 237 in placement system 214 may place portable machine 226 on workpiece 204.

Placement system 214 may be controlled by controller 212 and/or human operators depending on the particular implementation. When human operators are used to operate placement system 214, controller 212 may provide feedback to the human operators as to when a correct placement of group of portable machines 216 occurs with respect to number of locations 238.

Further, controller 212 may control placement system 214 to control the movement of group of portable machines 216 in manufacturing environment 200. In this manner, a possibility of two or more portable machines in group of portable machines 216 colliding with each other may be reduced. Further, controller 212 may control placement system 214 to reduce a possibility of one or more of group of portable machines 216 colliding with other equipment in manufacturing environment 200, having undesired contact with workpiece 204, and/or moving to a location in manufacturing environment 200 increasing difficulty in performing number of manufacturing operations 202 by group of portable machines 216.

Placement system 214 may comprise at least one of a platform, a crane, a robotic arm, a movable rack, or some other suitable type of apparatus that is configured to move a portable machine to a desired location to perform at least one manufacturing operation in number of manufacturing operations 202. Of course, depending on the implementation, placement system 214 may comprise any structure and/or device configured to move one, some, or all of group of portable machines 216, a portion of portable machine 226, and/or tool 228 connected to portable machine 226.

Further, in these illustrative examples, operator station 240 may be present in cell 206. Operator station 240 may be part of controller 212, part of manufacturing system 208, and/or a separate system from manufacturing system 208 in cell 206.

In these depicted examples, operator station 240 allows human operators to view information 217 about group of portable machines 216, workpiece information 230, and/or manufacturing information 232 identified by tracking system 210. For example, tracking system 210 and/or controller 212 may be configured to send these different types of information to operator station 240.

As depicted in these examples, this information and/or other suitable types of information may be displayed on graphical user interface 242 on display system 243 at operator station 240. Display system 243 may comprise any number of display devices. For example, display system 243 may include at least one of a touchscreen, a monitor, a liquid crystal display (LCD), a head-mounted display device, and other suitable types of display devices.

In some illustrative examples, controller 212 may generate visual cues, audible cues, and/or other indications using display system 243 that may be used by an operator to control the movement of group of portable machines 216 using placement system 214. In this manner, an operator may avoid moving a portable machine, such as a hand tool, too close to workpiece 204.

Further, human operators are able to interact with graphical user interface 242 using number of input devices 244. Number of input devices 244 may include, for example, without limitation, at least one of a keyboard, a virtual keyboard, a mouse, a pen, a joystick, a motion sensing input device, a motion tracking system, a camera, a video camera, and other suitable types of input devices.

Operator station 240 may allow human operators to interact with controller 212, placement system 214, group of portable machines 216, and/or tracking system 210. As one illustrative example, a human operator may use number of input devices 244 to control the movement of portable machine 226 relative to workpiece 204.

In some illustrative examples, a human operator may use operator station 240 to modify number of manufacturing operations 202 to be performed on workpiece 204. In other illustrative examples, a human operator may use operator station 240 to manage which portable machines in group of portable machines 216 perform number of manufacturing operations 202 on workpiece 204 and how number of manufacturing operations 202 are performed. In one illustrative example, a human operator may use operator station 240 to manage the types of information being identified by tracking system 210.

In other illustrative examples, controller 212 and/or tracking system 210 may be used to manage the locations of human operators within manufacturing environment 200. For example, tracking system 210 may be used to keep track of the locations of human operators performing number of manufacturing operations 202 on workpiece 204 using group of portable machines 216.

Figure 3:
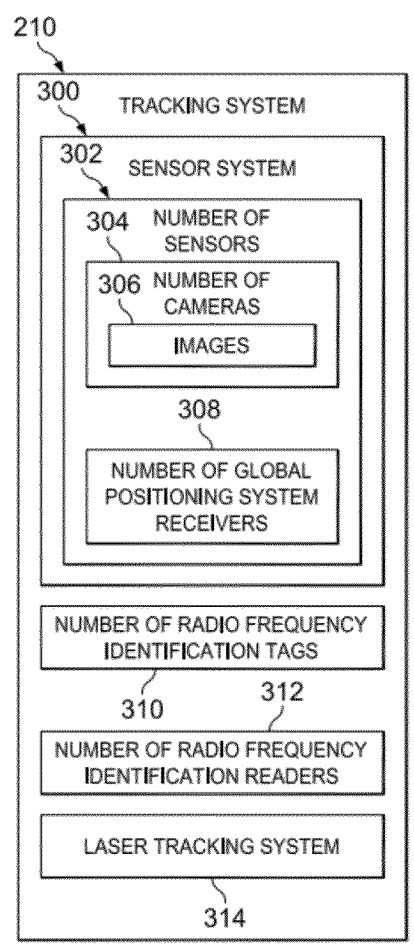
FIG. 3 is an illustration of a tracking system in the form of a block diagram in accordance with an advantageous embodiment.

With reference now to FIG. 3, an illustration of a tracking system in the form of a block diagram is depicted in accordance with an advantageous embodiment. In this illustrative example, tracking system 210 from FIG. 2 is depicted in more detail.

Tracking system 210 includes sensor system 300. Sensor system 300 comprises number of sensors 302. Number of sensors 302 may include sensors of different forms. For example, number of sensors 302 may include number of cameras 304.

Number of cameras 304 generates images 306, which may be used to identify characteristics 218 about group of portable machines 216 in FIG. 2. Tracking system 210 may identify characteristics 218 using images 306 or may send images 306 to controller 212 in FIG. 2. Controller 212 may use images 306 to identify characteristics 218 about group of portable machines 216.

In some illustrative examples, number of sensors 302 may include number of global positioning system receivers 308. A global positioning system receiver in number of global positioning system receivers 308 may be associated with portable machine 226, tool 228, or both portable machine 226 and tool 228 in FIG. 2. Tracking system 210 is configured to identify position information for portable machine 226 and/or tool 228 using the global positioning system receiver. Further, number of global positioning system receivers 308 may be used to track multiple portable machines in group of portable machines 216 in FIG. 2 simultaneously.

A first component, such as a global positioning system receiver, may be considered to be associated with a second component, such as tool 228, by being secured to the second component, bonded to the second component, welded to the second component, fastened to the second component, and/or connected to the second component in some other suitable manner. The first component also may be connected to the second component using a third component. The first component may also be considered to be associated with the second component by being formed as part of and/or an extension of the second component.

In one illustrative example, tracking system 210 may include number of radio frequency identification tags 310 and number of radio frequency identification readers 312. A radio frequency identification tag in number of radio frequency identification tags 310 may be associated with, for example, portable machine 226, tool 228, or both. Number of radio frequency identification readers 312 is configured to read signals transmitted from the radio frequency identification tags. Further, based on signal strengths and/or direction, number of radio frequency identification readers 312 identifies characteristics 218 for portable machine 226, tool 228, or both.

As another illustrative example, tracking system 210 may include laser tracking system 314. Laser tracking system 314 may be used to identify characteristics 218 for group of portable machines 216. In particular, laser tracking system 314 may be configured for tracking individual portable machines in group of portable machines 216 and/or the individual tools connected to these portable machines.

In these illustrative examples, number of radio frequency identification readers 312 and/or laser tracking system 314 may be part of sensor system 300 for tracking system 210. Further, one or more of these systems in tracking system 210 may be used alone or in combination with other systems to identify characteristics 218. For example, both laser tracking system 314 and number of cameras 304 may be used to identify characteristics 218.

Figure 4:
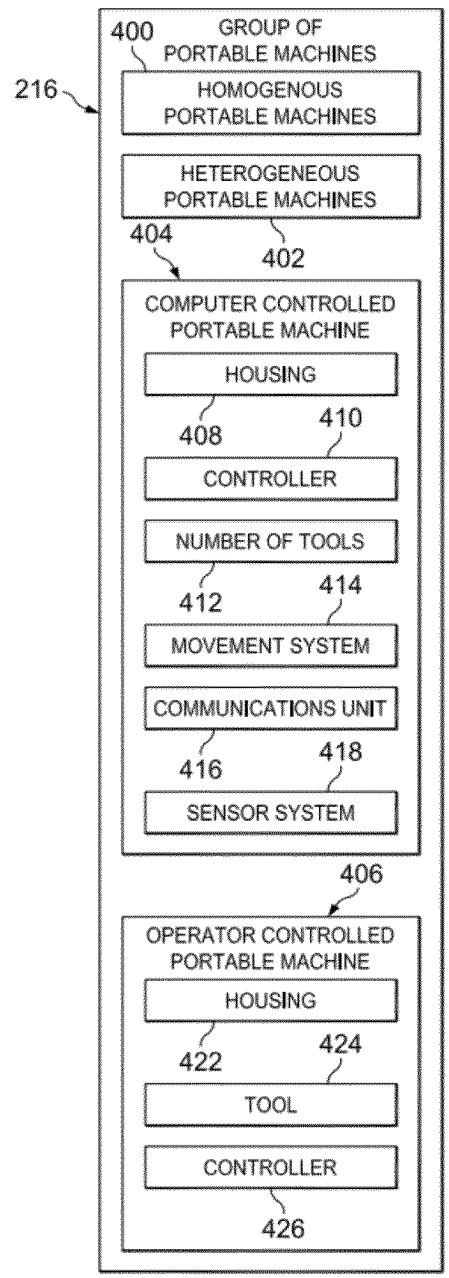
FIG. 4 is an illustration of a group of portable machines in the form of a block diagram in accordance with an advantageous embodiment.

With reference now to FIG. 4, an illustration of a group of portable machines in the form of a block diagram is depicted in accordance with an advantageous embodiment. In this illustrative example, group of portable machines 216 from FIG. 2 is depicted in more detail. When more than one portable machine is present in group of portable machines 216, group of portable machines 216 may take the form of homogeneous portable machines 400 and/or heterogeneous portable machines 402.

In these illustrative examples, a portable machine in group of portable machines 216 comprises at least one of computer controlled portable machine 404, operator controlled portable machine 406, and some other suitable type of portable machine that may be controlled by controller 212 in FIG. 2.

As depicted, computer controlled portable machine 404 may include housing 408, controller 410, number of tools 412, movement system 414, communications unit 416, and sensor system 418. Controller 410, number of tools 412, movement system 414, communications unit 416, and sensor system 418 may be associated with housing 408 for computer controlled portable machine 404.

Controller 410 may be a computer system, a processor unit, or some other suitable piece of hardware. Controller 410 may provide different levels of intelligence for computer controlled portable machine 404. In some cases, controller 410 merely receives commands to move computer controlled portable machine 404 particular distances and/or directions and to drill to a particular depth.

In other illustrative examples, controller 410 runs program code 236 received from controller 212 to perform number of manufacturing operations 202 in FIG. 2. Program code 236 may be, for example, instructions that provide distances to move on workpiece 204 and locations on workpiece 204 at which drilling operations should be performed.

In other illustrative examples, program code 236 may provide more intelligence. For example, program code 236 may include a neural network, an artificial intelligence program, or some other suitable type of program code. With this type of program code, identification of holes and locations to be drilled may be provided to computer controlled portable machine 404. Computer controlled portable machine 404 then perform number of manufacturing operations 202. Computer controlled portable machine 404 may perform one or more of number of manufacturing operations 202 from FIG. 2 based on an identification of where number of manufacturing operations 202 are to be performed and the type of operations to be performed.

In these illustrative examples, number of tools 412 includes tools that may be used to perform manufacturing operations.

For example, number of tools 412 may include at least one of a drill, a screwdriver, a sealant applicator, a cutter, a hole inspection tool, a torque tool, and other suitable types of tools.

Movement system 414 moves computer controlled portable machine 404 relative to workpiece 204 in FIG. 2. Movement system 414 may include, for example, without limitation, at least one of wheels, legs, tracks, rollers, and other suitable types of locomotion devices. The tracks may be, for example, tracks that fit around wheels, such as on a tank. In other cases, the tracks may be laid out on workpiece 204 and wheels, and/or some other suitable mechanism in movement system 414, may move housing 408 along the tracks to move computer controlled portable machine 404.

In these illustrative examples, communications unit 416 is configured to provide communication between controller 410 for computer controlled portable machine 404 and controller 212 in manufacturing system 208 in FIG. 2. Communications unit 416 may provide wired, wireless, optical, and/or some other suitable type of communication.

Sensor system 418 provides feedback as to whether number of manufacturing operations 202 are being performed in a manner that is desired. Sensor system 418 may not be present in computer controlled portable machine 404 in some cases and may be unnecessary with the use of tracking system 210.

In these illustrative examples, operator controlled portable machine 406 may comprise housing 422, tool 424, and controller 426. A human operator may move or position operator controlled portable machine 406 with respect to workpiece 204 in FIG. 2. Controller 212 from FIG. 2 may send a signal to controller 426 to allow operation of tool 424. This signal is sent when controller 212 determines that operator controlled portable machine 406 is ready to perform a manufacturing operation.

For example, tool 424 may need to be in a particular position and orientation with respect to workpiece 204 for the manufacturing operation to be performed. When the particular position and orientation for tool 424 is present, controller 426 sends the signal to allow operation of tool 424. Controller 426 may be as simple as a switch that is remotely controlled by controller 212 to supply power to tool 424 or may take the form of a processor unit depending on the particular implementation.

With reference now to FIG. 5, an illustration of a placement system in the form of a block diagram is depicted in accordance with an advantageous embodiment. In this illustrative example, placement system 214 from FIG. 2 is depicted in more detail. As depicted, placement system 214 comprises number of placement machines 500. Placement machine 501 is an example of one of number of placement machines 500.

In these illustrative examples, placement machine 501 includes number of movement devices 502. Number of movement devices 502 may include at least one of robotic arm 503, track system 504, movable rack 506, cart 508, platform 510, crane 512, and other suitable types of devices configured to move a portable machine in group of portable machines 216 in FIG. 2. Further, number of movement devices 502 may include devices configured to move placement machine 501.

A movement device in number of movement devices 502 may be computer controlled and/or operated by a human operator. As one illustrative example, portable machine 226 from FIG. 2 may be placed in cart 508. Cart 508 may be a movable cart. Cart 508 may be moved by a human operator and/or may be moved in response to commands from, for example, controller 212 in FIG. 2.

In these illustrative examples, track system 504 may include number of tracks 514. Number of tracks 514 may be tracks that may be movable. For example, a track in number of tracks 514 may be placed on workpiece 204 from FIG. 2.

Portable machine 226 in FIG. 2 may be placed on the track and may have wheels that allow portable machine 226 to move along the track to perform number of manufacturing operations 202. When portable machine 226 needs to be moved to a different location on workpiece 204, the track and portable machine 226 may be moved to a different location.

In some illustrative examples, some or all of number of movement devices 502 may be associated with a portable machine in group of portable machines 216. For example, number of movement devices 502 may include wheels that are associated with portable machine 226.

The illustration of manufacturing environment 200 in FIG. 2 and the different systems within manufacturing system 208 depicted in FIGS. 2-5 are not meant to imply physical or architectural limitations to the manner in which an advantageous embodiment may be implemented. Other components in addition to and/or in place of the ones illustrated may be used. Some components may be unnecessary. Also, the blocks are presented to illustrate some functional components. One or more of these blocks may be combined and/or divided into different blocks when implemented in an advantageous embodiment.

For example, in some illustrative examples, a number of tools in addition to, or in place of, tool may be connected to portable machine 226. Tracking system 210 may be configured to identify characteristics 218 for each of these tools.

Further, in other illustrative examples, operator station 240 may not be present in cell 206. For example, a human operator may use a portable head-mounted device to interact with controller 212. In some illustrative examples, a human operator interacts with controller 212 using a computer system in a location remote to cell 206. In this manner, the human operator may be involved in managing the performance of number of manufacturing operations 202 performed in cell 206 without being present in cell 206.

In other illustrative examples, additional components may be present in tracking system 210 other than the components described in FIG. 3. For example, tracking system 210 may include an infrared imaging system, an x-ray imaging system, and/or some other suitable type of component.

Figure 6:
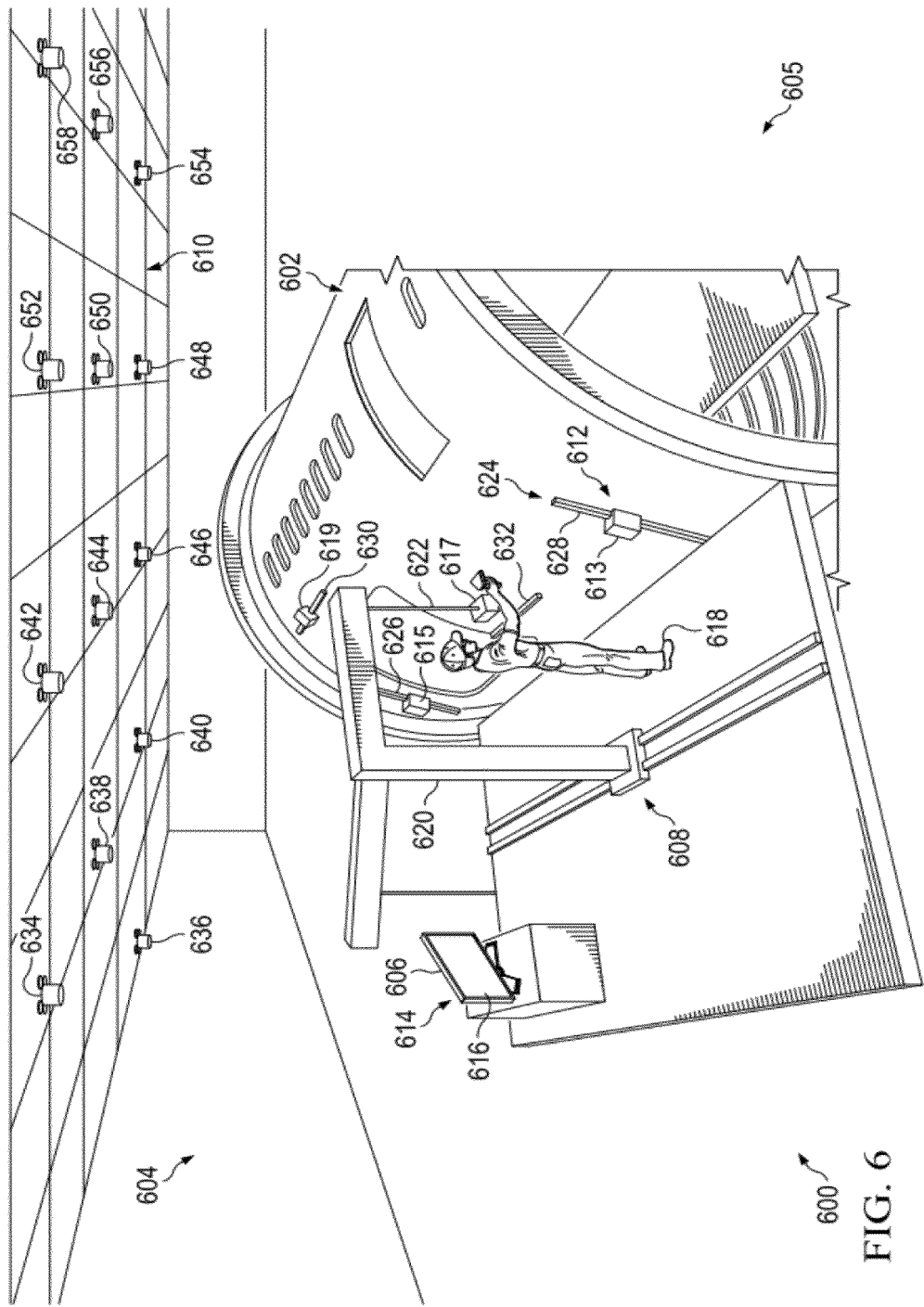
FIG. 6 is an illustration of a manufacturing environment in accordance with an advantageous embodiment.

With reference now to FIG. 6, an illustration of a manufacturing environment is depicted in accordance with an advantageous embodiment. In this illustrative example, manufacturing environment 600 is an example of one implementation for manufacturing environment 200 in FIG. 2.

As depicted, workpiece 602 and manufacturing system 604 are present in cell 605 in manufacturing environment 600. Workpiece 602 is part of a fuselage of an aircraft in this illustrative example. Manufacturing system 604 is configured to perform manufacturing operations on workpiece 602.

In this illustrative example, manufacturing system 604 includes controller 606, placement system 608, tracking system 610, and group of portable machines 612. Group of portable machines 612 includes portable machines 613, 615, 617, and 619.

Controller 606 is configured to control the performance of manufacturing operations on workpiece 602 by group of portable machines 612. As depicted, controller 606 is implemented using computer system 614. Computer system 614 includes display system 616. Display system 616 is an example of one implementation for display system 243 in FIG. 2. Human operator 618 may use information displayed on display system 616 to move one or more of group of portable machines 612 and/or manage the performance of manufacturing operations on workpiece 602.

In this illustrative example, placement system 608 includes structure 620 having arm 622 and track system 624. Arm 622 of structure 620 is connected to portable machine 617 in this depicted example. Human operator 618 may move arm 622 of structure 620 to move portable machine 617 relative to workpiece 602.

In this depicted example, portable machine 617 may be a hand tool that may be allowed to operate once the tool is in a correct position relative to workpiece 602. For example, controller 606 may be configured to control the operation of portable machine 617 by sending a command to move a switch to turn on the power for portable machine 617 once portable machine 617 is in the correct position.

Track system 624 includes tracks 626, 628, 630, and 632 attached to workpiece 602. Portable machine 615 moves along track 626 in this illustrative example. Portable machine 613 moves along track 628, and portable machine 619 moves along track 630. Further, portable machine 617 may be disconnected from arm 622 of structure 620 and placed on track 632 and attached to workpiece 602.

In this depicted example, tracking system 610 comprises cameras 634, 636, 638, 640, 642, 644, 646, 648, 650, 652, 654, 656, and 658. These cameras generate images used to identify information about group of portable machines 612, such as position, orientation, and movement.

Figure 7:
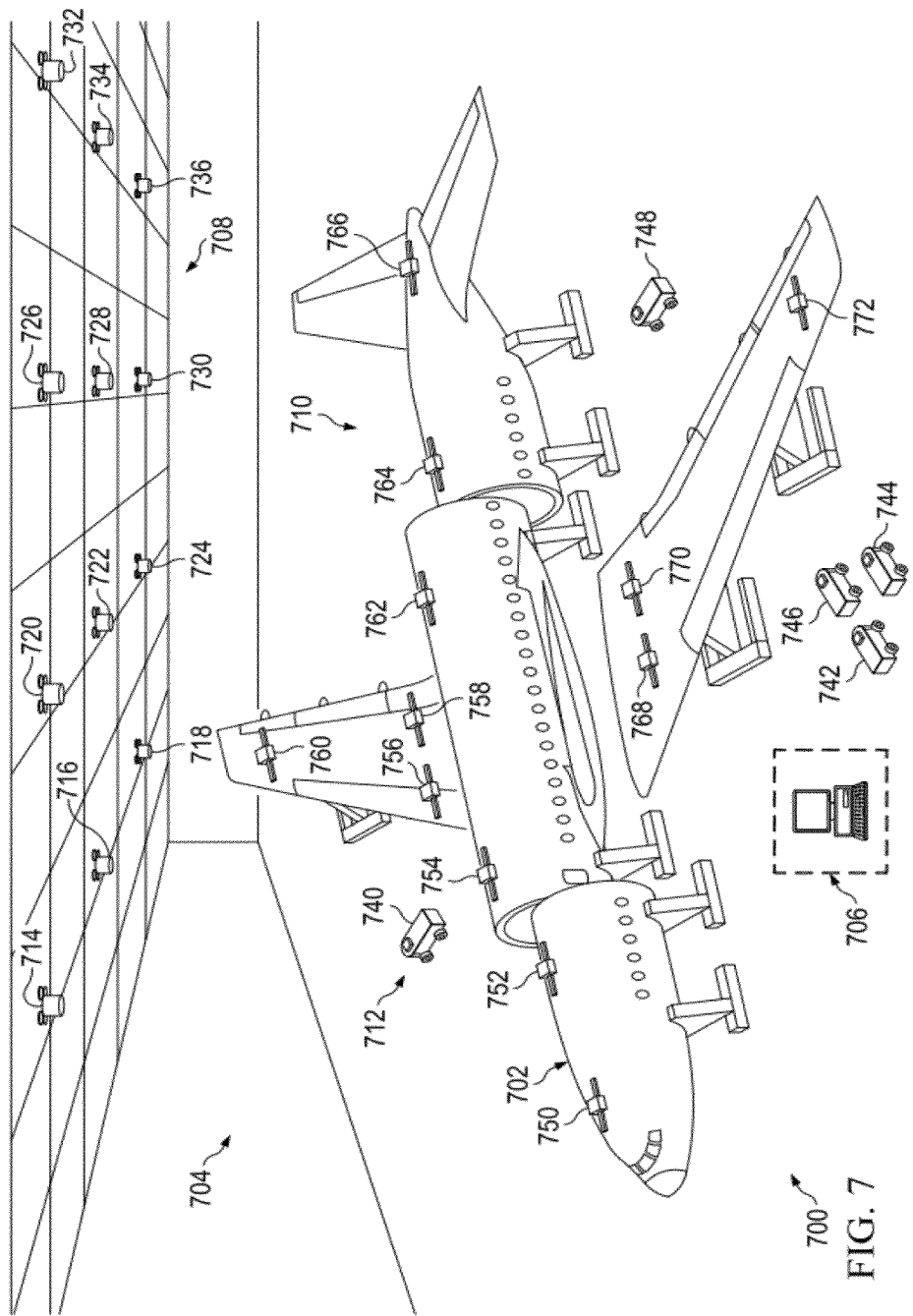
FIG. 7 is an illustration of another manufacturing environment in accordance with an advantageous embodiment.

With reference now to FIG. 7, an illustration of another manufacturing environment is depicted in accordance with an advantageous embodiment. In this illustrative example, manufacturing environment 700 is an example of one implementation for manufacturing environment 200 in FIG. 2.

As depicted, manufacturing operations are being performed on aircraft 702 by manufacturing system 704 in manufacturing environment 700. Manufacturing system 704 includes controller 706, tracking system 708, group of portable machines 710, and placement system 712.

Tracking system 708 comprises cameras 714, 716, 718, 720, 722, 724, 726, 728, 730, 732, 734, and 736. Placement system 712 includes vehicles 740, 742, 744, 746, and 748 that may be used to move portable machines 750, 752, 754, 756, 758, 760, 762, 764, 766, 768, 770, and 772 in group of portable machines 710 towards aircraft 702 and place them on aircraft 702. Further, placement system 712 may also include movement devices (not shown) associated with group of portable machines 710 that allow group of portable machines 710 to move along the various surfaces of aircraft 702.

With reference now to FIG. 8, an illustration of a display on a graphical user interface is depicted in accordance with an advantageous embodiment. In this illustrative example, graphical user interface 800 is an example of one implementation for graphical user interface 244 in FIG. 2. As depicted, display 802 is displayed on graphical user interface 800. A human operator may use display 802 to monitor the progress of manufacturing operations being performed on a workpiece.

Display 802 includes part number 804, work order 806, kit number 808, tool jig 810, operation 812, video 814, and log 816. Part number 804 identifies the particular workpiece on which manufacturing operations are being performed. Work order 806 identifies the particular work order for which the manufacturing operations are being performed. Kit number 808 identifies a group of unique components to be installed in a specific location on the workpiece. Tool jig 810 identifies the tool used to perform the manufacturing operations.

In this illustrative example, operation 812 identifies the particular manufacturing operation being performed and information about the operation. In this illustrative example, a drilling operation is being performed.

Video 814 is a video of the drilling operation generated as the drilling operation is being performed. This video may be generated using, for example, number of cameras 306 in tracking system 210 in FIG. 3. Additionally, log 816 identifies dates and times for operations and/or tasks performed.

With reference now to FIG. 9, an illustration of a flowchart of a process for managing manufacturing operations is depicted in accordance with an advantageous embodiment. The process illustrated in FIG. 9 may be implemented using manufacturing system 208 in FIG. 2 to manage number of manufacturing operations 202 performed on workpiece 204 in FIG. 2.

The process begins by identifying characteristics about a group of portable machines using a tracking system (operation 900). In operation 900, the characteristics may be identified using, for example, images and/or video generated by, for example, a motion capture system.

The process controls performance of a number of manufacturing operations on the workpiece by the group of portable machines using the characteristics about the group of portable machines (operation 902), with the process terminating thereafter. Operation 902 may be performed using a controller, such as controller 212 in FIG. 2.

In operation, performance of the number of manufacturing operations on the workpiece may be performed by sending commands, signals, and/or program code to the group of portable machines. For example, the controller sends a command to a portable machine in the group of portable machines to move a certain distance in a certain direction on the workpiece. As another illustrative example, the controller sends a signal to the portable machine turning on a power switch to a tool connected to the portable machine.

Figure 10:
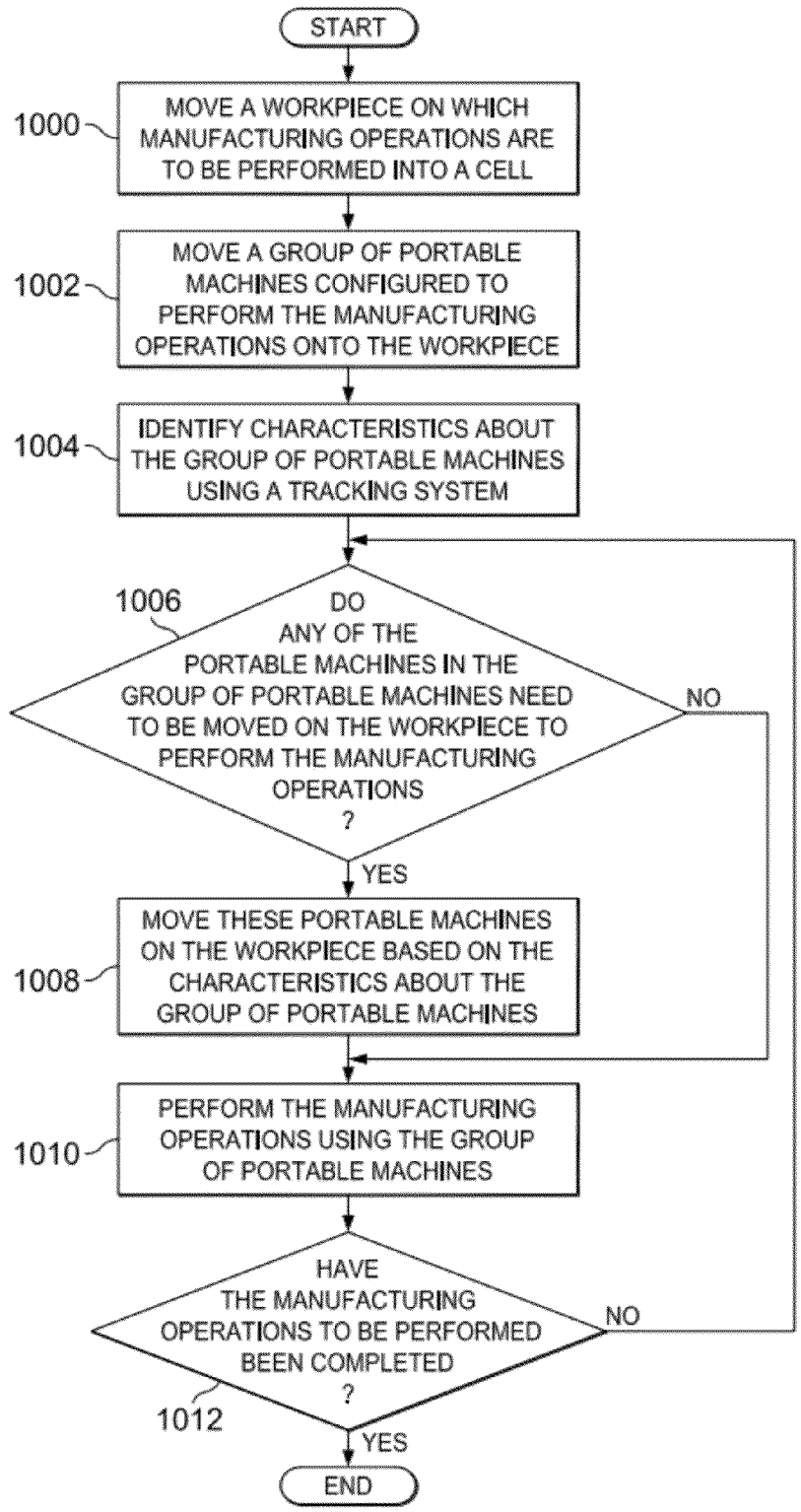
FIG. 10 is an illustration of a flowchart of a process for managing manufacturing operations in accordance with an advantageous embodiment.

With reference now to FIG. 10, an illustration of a flowchart of a process for managing manufacturing operations is depicted in accordance with an advantageous embodiment. The process illustrated in FIG. 10 may be implemented using manufacturing system 208 in FIG. 2 to manage number of manufacturing operations 202 performed on workpiece 204 in manufacturing environment 200 in FIG. 2.

The process begins by moving a workpiece on which manufacturing operations are to be performed into a cell (operation 1000). The cell is an area in which the manufacturing operations are to be performed. The cell may be, for example, a hangar, an area in a manufacturing facility, a building, a room in a factory, or some other suitable type of area.

The process moves a group of portable machines configured to perform the manufacturing operations onto the workpiece (operation 1002). Next, the process identifies characteristics about the group of portable machines using a tracking system (operation 1004).

In operation 1004, the tracking system may take the form of, for example, a motion capture system. The motion capture system may be used to identify a position, an orientation, and movement of each of the group of portable machines and/or any tools connected to each portable machine. In this illustrative example, operation 1004 may be performed before and/or after the manufacturing operations are performed as well as while the manufacturing operations are being performed.

The process determines whether any of the portable machines in the group of portable machines needs to be moved on the workpiece to perform the manufacturing operations (operation 1006). Movement of a portable machine may include moving one or more tools connected to the portable machine without moving the portable machine itself.

If any of the portable machines in the group of portable machines needs to be moved, the process moves these portable machines on the workpiece based on the characteristics about the group of portable machines (operation 1008). The process performs the manufacturing operations using the group of portable machines (operation 1010).

The process determines whether the manufacturing operations to be performed have been completed (operation 1012). If the manufacturing operations have been completed, the process terminates. Otherwise, the process returns to operation 1006 as described above.

In this illustrative example, operation 1012 may be performed while operation 1010 is being performed. In this manner, a portable machine and/or tool connected to the portable machine may be moved on workpiece as the manufacturing operations are being performed. For example, while a first portion of the group of portable machines are drilling holes along a length of the workpiece, a second portion of the group of portable machines may be installing fasteners into each of the holes as the second group is moved on the workpiece.

With reference again to operation 1006, if none of the group of portable machines needs to be moved, the process proceeds to operation 1010 as described above.

Figure 11:
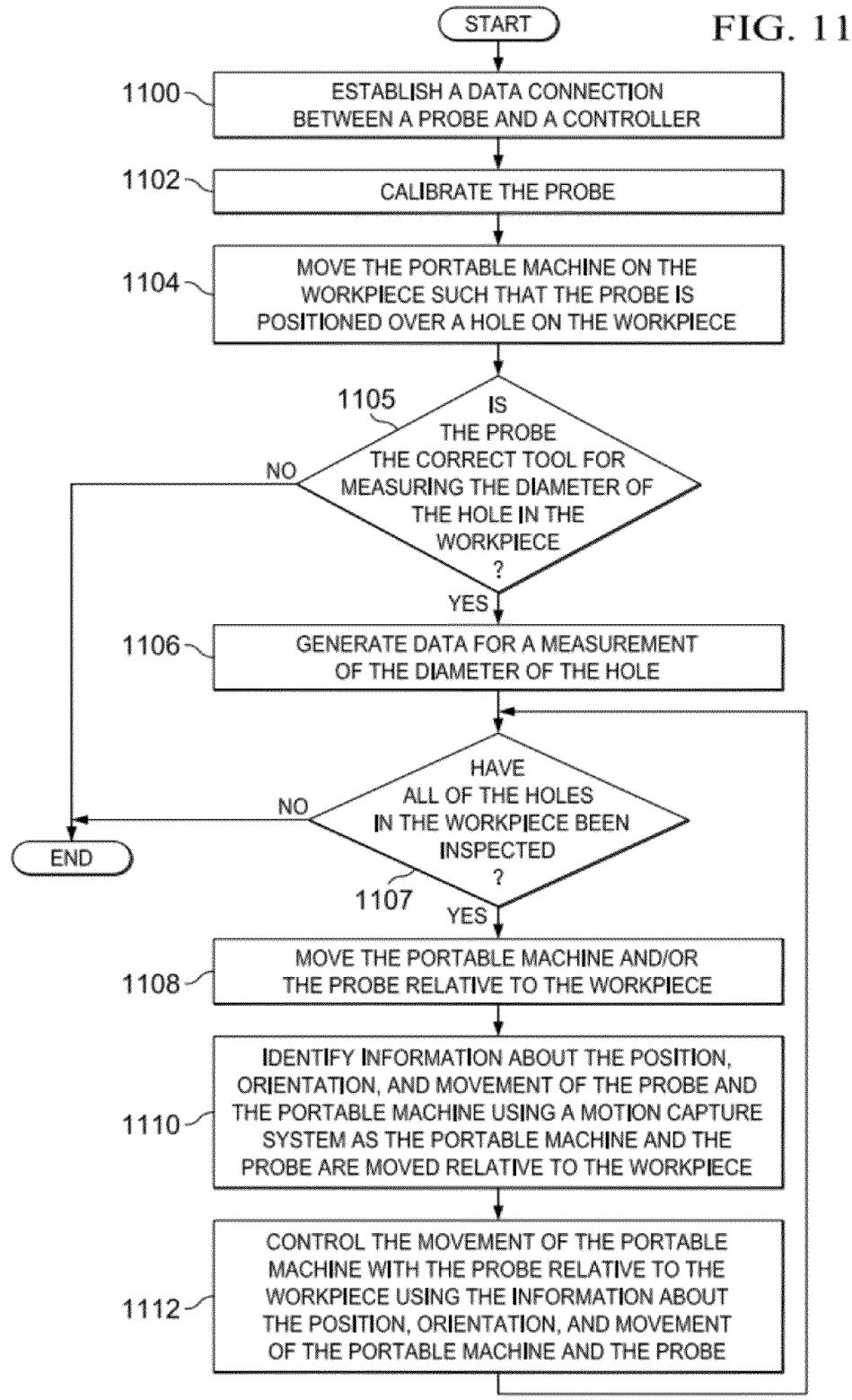
FIG. 11 is an illustration of a process for inspecting holes that have been drilled into a workpiece in accordance with an advantageous embodiment.

With reference now to FIG. 11, an illustration of a flowchart of a process for inspecting holes that have been drilled into a workpiece is depicted in accordance with an advantageous embodiment. The process illustrated in FIG. 11 may be implemented using manufacturing system 208 in FIG. 2.

The process begins by establishing a data connection between a probe and a controller (operation 1100). In this illustrative example, the probe is configured to generate data for a measurement of a diameter for a hole. The probe may be connected to a portable machine. The controller in operation 1100 may be implemented using controller 212 in FIG. 2.

The process calibrates the probe (operation 1102). In some illustrative examples, operation 1102 may be performed prior to operation 1100. The process then moves the portable machine on the workpiece such that the probe is positioned over a hole on the workpiece (operation 1104).

Thereafter, the process determines whether the probe is the correct tool for measuring the diameter of the hole in the workpiece (operation 1105). If the probe is not the correct tool for measuring the diameter of the hole, the process terminates. In other words, the measurement is not performed.

Otherwise, if the probe is the correct tool, the probe generates data for a measurement of the diameter of the hole (operation 1106). The process determines whether all of the holes in the workpiece have been inspected (operation 1107). If all of the holes in the workpiece have been inspected, the process terminates. Otherwise, the process then moves the portable machine and/or the probe relative to the workpiece (operation 1108). In operation 1108, the portable machine and/or the probe may be moved towards another hole to be inspected.

The process identifies information about the position, orientation, and movement of the probe and the portable machine using a motion capture system as the portable machine and the probe are moved relative to the workpiece (operation 1110). In this illustrative example, operation 1110 may be performed while operation 1108 is being performed. Further, operation 1110 may be performed continuously, as all of the holes in the workpiece are inspected, or periodically.

The controller controls the movement of the portable machine with the probe relative to the workpiece using the information about the position, orientation, and movement of the portable machine and the probe (operation 1112). Thereafter, the process returns to operation 1107 as described above.

In operation 1112, the control sends commands to the portable machine to direct movement of the portable machine and/or the probe relative to the workpiece. In particular, the controller may use the information identified about the position, orientation, and movement of the probe to find the nearest hole that is to be inspected next. The controller may then send commands to the portable machine to move the portable machine and/or probe a certain distance and/or in a certain direction relative to the workpiece.

In this illustrative example, operation 1112 may be performed while operation 1108 is being performed. In this manner, the movement of the portable machine with the probe relative to the workpiece as the holes are inspected may be controlled to reduce the time and/or effort needed for inspecting all of the holes.

The flowcharts and block diagrams in the different depicted embodiments illustrate the architecture, functionality, and operation of some possible implementations of the methods and apparatus in an advantageous embodiment. In this regard, each block in the flowcharts or block diagrams may represent a module, segment, function, and/or a portion of an operation or step. For example, one or more of the blocks may be implemented as program code, in hardware, or a combination of the program code and hardware. When implemented in hardware, the hardware may, for example, take the form of integrated circuits that are manufactured or configured to perform one or more operations in the flowcharts or block diagrams.

In some alternative implementations of an advantageous embodiment, the function or functions noted in the block may occur out of the order noted in the figures. For example, in some cases, two blocks shown in succession may be executed substantially concurrently, or the blocks may sometimes be performed in the reverse order, depending upon the functionality involved. Also, other blocks may be added in addition to the illustrated blocks in a flowchart or block diagram.

Turning now to FIG. 12, an illustration of a data processing system is depicted in accordance with an advantageous embodiment. In this illustrative example, data processing system 1200 may be used to implement a computer in computer system 233 in FIG. 2, controller 410 in FIG. 4, and/or controller 426 in FIG. 4. Data processing system 1200 includes communications fabric 1202, which provides communications between processor unit 1204, memory 1206, persistent storage 1208, communications unit 1210, input/output (I/O) unit 1212, and display 1214.

Processor unit 1204 serves to execute instructions for software that may be loaded into memory 1206. Processor unit 1204 may be a number of processors, a multi-processor core, or some other type of processor, depending on the particular implementation. Further, processor unit 1204 may be implemented using a number of heterogeneous processor systems in which a main processor is present with secondary processors on a single chip. As another illustrative example, processor unit 1204 may be a symmetric multi-processor system containing multiple processors of the same type.

Memory 1206 and persistent storage 1208 are examples of storage devices 1216. A storage device is any piece of hardware that is capable of storing information, such as, for example, without limitation, data, program code in functional form, and/or other suitable information either on a temporary basis and/or a permanent basis. Storage devices 1216 may also be referred to as computer readable storage devices in these examples. Memory 1206, in these examples, may be, for example, a random access memory or any other suitable volatile or non-volatile storage device. Persistent storage 1208 may take various forms, depending on the particular implementation.

For example, persistent storage 1208 may contain one or more components or devices. For example, persistent storage 1208 may be a hard drive, a flash memory, a rewritable optical disk, a rewritable magnetic tape, or some combination of the above. The media used by persistent storage 1208 also may be removable. For example, a removable hard drive may be used for persistent storage 1208.

Communications unit 1210, in these examples, provides for communications with other data processing systems or devices. In these examples, communications unit 1210 is a network interface card. Communications unit 1210 may provide communications through the use of either or both physical and wireless communications links.

Input/output unit 1212 allows for input and output of data with other devices that may be connected to data processing system 1200. For example, input/output unit 1212 may provide a connection for user input through a keyboard, a mouse, and/or some other suitable input device. Further, input/output unit 1212 may send output to a printer. Display 1214 provides a mechanism to display information to a user.

Instructions for the operating system, applications, and/or programs may be located in storage devices 1216, which are in communication with processor unit 1204 through communications fabric 1202. In these illustrative examples, the instructions are in a functional form on persistent storage 1208. These instructions may be loaded into memory 1206 for execution by processor unit 1204. The processes of the different embodiments may be performed by processor unit 1204 using computer implemented instructions, which may be located in a memory, such as memory 1206.

These instructions are referred to as program code, computer usable program code, or computer readable program code that may be read and executed by a processor in processor unit 1204. The program code in the different embodiments may be embodied on different physical or computer readable storage media, such as memory 1206 or persistent storage 1208.

Program code 1218 is located in a functional form on computer readable media 1220 that is selectively removable and may be loaded onto or transferred to data processing system 1200 for execution by processor unit 1204. Program code 1218 and computer readable media 1220 form computer program product 1222 in these examples. In one example, computer readable media 1220 may be computer readable storage media 1224 or computer readable signal media 1226. Computer readable storage media 1224 may include, for example, an optical or magnetic disk that is inserted or placed into a drive or other device that is part of persistent storage 1208 for transfer onto a storage device, such as a hard drive, that is part of persistent storage 1208.

Computer readable storage media 1224 also may take the form of a persistent storage, such as a hard drive, a thumb drive, or a flash memory, that is connected to data processing system 1200. In some instances, computer readable storage media 1224 may not be removable from data processing system 1200. In these examples, computer readable storage media 1224 is a physical or tangible storage device used to store program code 1218 rather than a medium that propagates or transmits program code 1218. Computer readable storage media 1224 is also referred to as a computer readable tangible storage device or a computer readable physical storage device. In other words, computer readable storage media 1224 is a media that can be touched by a person.

Alternatively, program code 1218 may be transferred to data processing system 1200 using computer readable signal media 1226. Computer readable signal media 1226 may be, for example, a propagated data signal containing program code 1218. For example, computer readable signal media 1226 may be an electromagnetic signal, an optical signal, and/or any other suitable type of signal. These signals may be transmitted over communications links, such as wireless communications links, optical fiber cable, coaxial cable, a wire, and/or any other suitable type of communications link. In other words, the communications link and/or the connection may be physical or wireless in the illustrative examples.

In some advantageous embodiments, program code 1218 may be downloaded over a network to persistent storage 1208 from another device or data processing system through computer readable signal media 1226 for use within data processing system 1200. For instance, program code stored in a computer readable storage medium in a server data processing system may be downloaded over a network from the server to data processing system 1200. The data processing system providing program code 1218 may be a server computer, a client computer, or some other device capable of storing and transmitting program code 1218.

The different components illustrated for data processing system 1200 are not meant to provide architectural limitations to the manner in which different embodiments may be implemented. The different advantageous embodiments may be implemented in a data processing system including components in addition to or in place of those illustrated for data processing system 1200. Other components shown in FIG. 12 can be varied from the illustrative examples shown. The different embodiments may be implemented using any hardware device or system capable of running program code.

In another illustrative example, processor unit 1204 may take the form of a hardware unit that has circuits that are manufactured or configured for a particular use. This type of hardware may perform operations without needing program code to be loaded into a memory from a storage device to be configured to perform the operations.

For example, when processor unit 1204 takes the form of a hardware unit, processor unit 1204 may be a circuit system, an application specific integrated circuit (ASIC), a programmable logic device, or some other suitable type of hardware configured to perform a number of operations. With a programmable logic device, the device is configured to perform the number of operations. The device may be reconfigured at a later time or may be permanently configured to perform the number of operations. Examples of programmable logic devices include, for example, a programmable logic array, a programmable array logic, a field programmable logic array, a field programmable gate array, and other suitable hardware devices. With this type of implementation, program code 1218 may be omitted because the processes for the different embodiments are implemented in a hardware unit.

In still another illustrative example, processor unit 1204 may be implemented using a combination of processors found in computers and hardware units. Processor unit 404 may have a number of hardware units and a number of processors that are configured to run program code 1218. With this depicted example, some of the processes may be implemented in the number of hardware units, while other processes may be implemented in the number of processors.

In another example, a bus system may be used to implement communications fabric 1202 and may be comprised of one or more buses, such as a system bus or an input/output bus. Of course, the bus system may be implemented using any suitable type of architecture that provides for a transfer of data between different components or devices attached to the bus system.

Embodiments of the disclosure may be used in the context of aircraft manufacturing and service method 1300 as shown in FIG. 13 and aircraft 1400 as shown in FIG. 14. Turning first to FIG. 13, an illustration of an aircraft manufacturing and service method is depicted in accordance with an advantageous embodiment. During pre-production, aircraft manufacturing and service method 1300 may include specification and design 1302 of aircraft 1400 in FIG. 14 and material procurement 1304.

During production, component and subassembly manufacturing 1306 and system integration 1308 of aircraft 1400 in FIG. 14 takes place. Thereafter, aircraft 1400 in FIG. 14 may go through certification and delivery 1310 in order to be placed in service 1312. While in service 1312 by a customer, aircraft 1400 in FIG. 14 is scheduled for routine maintenance and service 1314, which may include modification, reconfiguration, refurbishment, and other maintenance or service.

Each of the processes of aircraft manufacturing and service method 1300 may be performed or carried out by a system integrator, a third party, and/or an operator. In these examples, the operator may be a customer. For the purposes of this description, a system integrator may include, without limitation, any number of aircraft manufacturers and major-system subcontractors; a third party may include, without limitation, any number of vendors, subcontractors, and suppliers; and an operator may be an airline, a leasing company, a military entity, a service organization, and so on.

With reference now to FIG. 14, an illustration of an aircraft is depicted in which an advantageous embodiment may be implemented. In this example, aircraft 1400 is produced by aircraft manufacturing and service method 1300 in FIG. 13 and may include airframe 1402 with plurality of systems 1404 and interior 1406. Examples of systems 1404 include one or more of propulsion system 1408, electrical system 1410, hydraulic system 1412, and environmental system 1414. Any number of other systems may be included. Although an aerospace example is shown, different advantageous embodiments may be applied to other industries, such as the automotive industry.

Apparatuses and methods embodied herein may be employed during at least one of the stages of aircraft manufacturing and service method 1300 in FIG. 13. In one illustrative example, components or subassemblies produced in component and subassembly manufacturing 1306 in FIG. 13 may be fabricated or manufactured in a manner similar to components or subassemblies produced while aircraft 1400 is in service 1312 in FIG. 13. As yet another example, a number of apparatus embodiments, method embodiments, or a combination thereof may be utilized during production stages, such as component and subassembly manufacturing 1306 and system integration 1308 in FIG. 13.

A number of apparatus embodiments, method embodiments, or a combination thereof may be utilized while aircraft 1400 is in service 1312 and/or during maintenance and service 1314 in FIG. 13. The use of a number of the different advantageous embodiments may substantially expedite the assembly of and/or cost of aircraft 1400. As one illustrative example, manufacturing system 208 in FIG. 2 may be used during maintenance and service 1314 to manufacture parts that may be needed to perform replacement of parts in aircraft 1400, perform upgrades of aircraft 1400, reconfiguration of aircraft 1400, and other operations.

Thus, the different advantageous embodiments provide a method and apparatus for managing manufacturing operations. In one advantageous embodiment, an apparatus comprises a tracking system and a controller in communication with the tracking system. The tracking system is configured to identify characteristics about a group of portable machines configured to perform a number of manufacturing operations on a workpiece. The controller is configured to control performance of the number of manufacturing operations on the workpiece using the characteristics about the group of portable machine identified using the tracking system.

In this manner, one or more of the different advantageous embodiments provide a system for managing manufacturing operations that reduces the time and/or effort needed for moving portable machines relative to a workpiece to perform the manufacturing operations. In particular, the different advantageous embodiments provide a system for directing movement of portable machines relative to a workpiece more accurately and efficiently as compared to human operators moving these machines without assistance from a manufacturing system, such as manufacturing system 208.

The description of the present disclosure has been presented for purposes of illustration and description, and is not intended to be exhaustive or limited to the disclosure in the form disclosed. Many modifications and variations will be apparent to those of ordinary skill in the art. Further, different advantageous embodiments may provide different advantages as compared to other advantageous embodiments. The embodiment or embodiments selected are chosen and described in order to best explain the principles of the disclosure, the practical application, and to enable others of ordinary skill in the art to understand the disclosure for various embodiments with various modifications as are suited to the particular use contemplated.

What is claimed is:

1. An apparatus comprising:
   a tracking system configured to identify characteristics about a plurality of portable machines configured to perform a plurality of manufacturing operations on a workpiece, wherein the characteristics include information about multiple ones of the plurality of portable machines; and
   a controller in communication with the tracking system, wherein the controller is configured to control performance of individual ones of manufacturing operations on the workpiece using the characteristics about the plurality of portable machines identified using the tracking system, wherein, in response to a determination that ones of the plurality of portable machines is in a correct position relative to workpiece, the controller is configured to send at least one of a command and a program to ones of the plurality of portable machines to control the performance of the individual ones of manufacturing operations on the workpiece based on the characteristics such that an individual portable machine in the plurality of portable machines is controlled at least in part by information about another machine in the plurality of individual portable machines.

2. The apparatus of claim 1 further comprising:
   the plurality of portable machines.

3. The apparatus of claim 1, wherein the tracking system is further configured to identify information about the workpiece.

4. The apparatus of claim 1, wherein the tracking system comprises a number of cameras.

5. The apparatus of claim 1, wherein the tracking system comprises:
   a number of radio frequency identification tags associated with the plurality of portable machines; and a number of radio frequency identification readers configured to identify position information about the plurality of portable machines using the number of radio frequency identification tags.

6. The apparatus of claim 1, wherein the controller is configured to receive information about the workpiece and information about the plurality of portable machines from the tracking system in which the information about the plurality of portable machines comprises the characteristics about the plurality of portable machines and wherein in being configured to control the performance of the plurality of manufacturing operations on the workpiece using the characteristics about the plurality of portable machines are identified using the tracking system, the controller is configured to control the performance of the plurality of manufacturing operations on the workpiece using the information about the workpiece, the information about the plurality of portable machines, and the characteristics about the plurality of portable machines identified using the tracking system.

7. The apparatus of claim 1, wherein in being configured to control the performance of the plurality of manufacturing operations on the workpiece using the characteristics about the plurality of portable machines identified using the tracking system, the controller is configured to send at the least one of a command and a program using the characteristics about the plurality of portable machines identified using the tracking system.

8. The apparatus of claim 1, wherein when a portable machine in the plurality of portable machines is a tool positioned by a human operator and wherein in being configured to control the performance of the plurality of manufacturing operations on the workpiece using the characteristics about the plurality of portable machines identified using the tracking system, the controller is configured to send a signal to allow the portable machine to be operated by the human operator when the characteristics about the tool in the plurality of portable machines identified using the tracking system indicates that the tool is in a position relative to the workpiece to perform a desired manufacturing operation on the workpiece.

9. The apparatus of claim 1, wherein a portable machine in the plurality of portable machines is selected from one of a computer controlled portable machine and an operator controlled portable machine.

10. The apparatus of claim 1, wherein the characteristics about the plurality of portable machines comprise at least one of a position of a portable machine, an orientation of the portable machine, and movement of the portable machine.

11. The apparatus of claim 1, wherein a manufacturing operation in the plurality of manufacturing operations is selected from one of a drilling operation, a sealing operation, a fastener installation operation, an inspection operation, and a painting operation.

12. The apparatus of claim 1, wherein the workpiece is selected from one of an aircraft, an aircraft part, a wing, a stabilizer, a portion of a fuselage, an engine, an engine housing, and a landing gear assembly.

13. A method for managing manufacturing operations, the method comprising:
identifying characteristics about a plurality of portable machines using a tracking system and a controller, wherein the characteristics include information about multiple ones of the plurality of portable machines; and
controlling performance of a plurality of manufacturing operations on a workpiece by the plurality of portable machines using the characteristics about the plurality of portable machines identified using the tracking system, wherein controlling comprises sending at least one of a command and a program to the plurality of portable machines in response to a determination that the plurality of portable machines is in a correct position relative to the workpiece to control the performance of the plurality of manufacturing operations on the workpiece based on the characteristics such that an individual portable machine in the plurality of portable machines is controlled at least in part by information about another machine in the plurality of individual portable machines.

14. The method of claim 13 further comprising:
identifying information about the workpiece using the tracking system and the controller.

15. The method of claim 13 further comprising:
receiving information about the workpiece and information about the plurality of portable machines; and
wherein the controlling step comprises:
controlling the performance of the plurality of manufacturing operations on the workpiece using the information about the workpiece, the information about the plurality of portable machines, and the characteristics about the plurality of portable machines identified using the tracking system.

16. The method of claim 13, wherein sending the at least one of a command and a program to the plurality of portable machines to control the performance of the plurality of manufacturing operations on the workpiece comprises using the characteristics about the plurality of portable machines identified using the tracking system.

17. The method of claim 13, wherein the identifying step comprises:
identifying the characteristics about the plurality of portable machines using a number of cameras in the tracking system.

18. The method of claim 13, wherein the characteristics about the plurality of portable machines comprise position information and further comprising:
identifying the position information about the plurality of portable machines using a number of radio frequency identification readers and a number of radio frequency identification tags in the tracking system, wherein the number of radio frequency identification tags is associated with the plurality of portable machines.

19. The method of claim 13, wherein a portable machine in the plurality of portable machines is a tool positioned by a human operator and wherein the controlling step further comprises:
sending a signal to allow the portable machine to be operated by the human operator when the characteristics about the plurality of portable machines identified using the tracking system indicates that the portable machine is in a position relative to the workpiece to perform a desired manufacturing operation on the workpiece.

* * * * *